J. A. ALLEN.
PRUNING IMPLEMENT.
APPLICATION FILED JUNE 17, 1910.
978,102.
Patented Dec. 6, 1910.
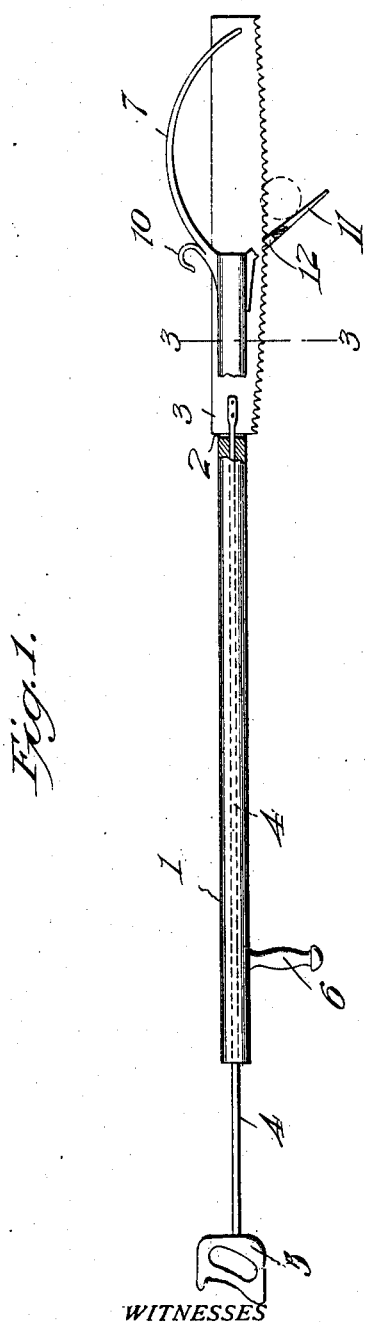
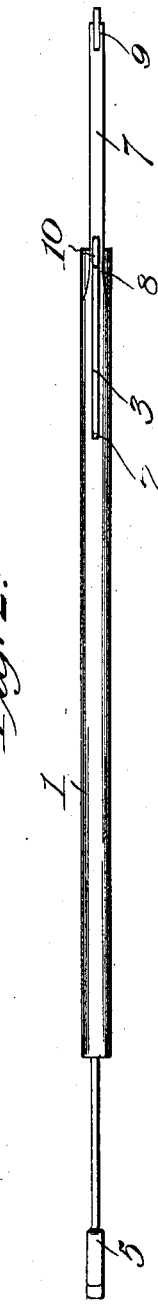
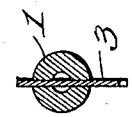
WITNESSES
INVENTOR

UNITED STATES PATENT OFFICE.

JOHN A. ALLEN, OF PAINTED POST, NEW YORK.

PRUNING IMPLEMENT.

978,102.  Specification of Letters Patent.  Patented Dec. 6, 1910.

Application filed June 17, 1910. Serial No. 567,514.

*To all whom it may concern:*

Be it known that I, JOHN A. ALLEN, a citizen of the United States, residing at Painted Post, in the county of Steuben and State of New York, have invented certain new and useful Improvements in Pruning Implements, of which the following is a specification.

The present invention relates to pruning implements and more especially to devices of that character employed for trimming trees, and has for its purpose to provide such an article for removing from trees such limbs as are too heavy for cutting off by the pruning devices which employ the shearing blade.

A further object is to present a pruning implement of such construction as to be readily manipulated by a single person, and whose design and simplicity are such as will commend the article to agriculturists generally.

Summarily stated the invention comprises a pole having a saw mounted to reciprocate therein, a handle for operating the saw, a means for guiding to the saw the limb to be removed, progressively with the cutting action; and an attachment for removing the cut-off limbs from the tree.

The invention is shown in its preferred structure in the accompanying drawing, wherein, Figure 1 is a side elevation of the implement with parts thereof shown in section; Fig. 2 is a top plan view of the same; and Fig. 3 is a transverse sectional view of Fig. 1, taken on the line 3—3.

Referring to the several figures in further detail and with like characters of reference indicating corresponding parts in the different views shown, 1 designates a supporting tubular handle or pole of any suitable material, and of the required length. One end of the handle is bifurcated, as indicated by the numeral 2, to receive and permit of reciprocations of the saw 3, which saw is designed to cut in both directions of its movement. The actuation of the saw is effected through the medium of the rod 4, which passes lengthwise through the tubular handle 1 and is provided with a handle 5. In addition to the handle 5, the implement has a second handle or fixed gripping member 6 mounted on the pole 1.

The bifurcated end of the pole 1 is provided with an extended portion 7, shaped in the form of an arc and is itself bifurcated at its opposite ends as indicated by the numerals 8 and 9 respectively. Said bifurcations 8 and 9 are in alinement of and coöperate with the bifurcation 2, whereby to provide a guide-way for the saw blade. The extended member 7 carries a hook 10 disposed adjacent the end of the pole and is designed to serve as a means for removing from the tree such limbs as have been cut by the saw.

As set forth at the outset of the specification, the implement is designed especially for cutting off heavy limbs and to this end, a means is provided which automatically effects to bring the saw into contact with the limb being cut progressively with the cutting action. This means comprises a prong 11 secured at the end of the pole 1, adjacent the cutting edge of the saw and disposed in such relation thereto as to direct against the saw edge the limb being cut, in direct proportion as the prong 11 is held against said limb. The member 11 is likewise bifurcated as indicated at 12 to permit of the reciprocations of the saw and also serves as an additional guiding means for the cutting member; and it has the further provision that it serves as a reinforcing means for the bifurcated end of the pole. In this connection, the bifurcated portion 8 of the guiding member 7 has a like function.

While I have shown and described the implement in full detail, I do not wish it understood that I have limited myself to the precise features shown but rather reserve instead, the right to make such changes in the structure and arrangement of parts as will better adapt the invention to the purpose in view, limiting myself only to such disclosures as are made in the prior art, to which the present invention pertains.

I claim:—

A pruning implement comprising a pole having a bifurcated end portion, a saw mounted to reciprocate therein, a rod secured to the saw and passing through the handle and providing the saw operating means, an arcuate member carried by the pole at the bifurcated end thereof and extending in the lengthwise direction of the pole and having bifurcated portions at either end embracing the saw blade, said bifurcated portions providing guiding means for the saw, a diagonally disposed member carried by the pole adjacent the saw cutting edge and providing a means for directing to the saw the limb to be severed, said directing member being bifurcated adjacent the pole to permit of the movement of the saw.

The foregoing specification signed at Painted Post, Steuben Co., New York, this ninth day of June, 1910.

JOHN A. ALLEN.

In presence of—
Q. W. WELLINGTON,
B. WELLINGTON.